United States Patent
Izzo et al.

(10) Patent No.: US 12,006,434 B2
(45) Date of Patent: Jun. 11, 2024

(54) PHOTOCURABLE COMPOSITIONS AND METHOD OF FORMING TOPOGRAPHICAL FEATURES ON A MEMBRANE SURFACE USING PHOTOCURABLE COMPOSITIONS

(71) Applicant: Henkel AG & Co. KGaA, Duesseldorf (DE)

(72) Inventors: Michael Izzo, South Windsor, CT (US); Ivan Johnson, Wallingford, CT (US); Shuhua Jin, Cheshire, CT (US)

(73) Assignee: Henkel AG & Co. KGaA, Duesseldorf (DE)

(*) Notice: Subject to any disclaimer, the term of this patent is extended or adjusted under 35 U.S.C. 154(b) by 214 days.

(21) Appl. No.: 17/034,140

(22) Filed: Sep. 28, 2020

(65) Prior Publication Data
US 2021/0009806 A1 Jan. 14, 2021

Related U.S. Application Data

(63) Continuation of application No. PCT/US2019/024466, filed on Mar. 28, 2019.
(Continued)

(51) Int. Cl.
*B01D 67/00* (2006.01)
*B01D 61/02* (2006.01)
(Continued)

(52) U.S. Cl.
CPC ............ *C08L 75/16* (2013.01); *B01D 61/025* (2013.01); *B01D 67/0034* (2013.01);
(Continued)

(58) Field of Classification Search
CPC ............ B01D 2313/14; B01D 2325/08; B01D 61/025; B01D 67/0034; B01D 69/02;
(Continued)

(56) References Cited

U.S. PATENT DOCUMENTS

| 4,258,123 A | 3/1981 | Nagashima et al. |
| 4,505,793 A | 3/1985 | Tamoto et al. |

(Continued)

FOREIGN PATENT DOCUMENTS

| DE | 10141647 | 1/2008 |
| EP | 0369645 | 5/1990 |

(Continued)

OTHER PUBLICATIONS

International Search Report issued in connection with International Patent Application No. PCT/US2019/024466 dated Jul. 23, 2019.
(Continued)

*Primary Examiner* — Bradley R Spies
*Assistant Examiner* — Jeannie McDermott
(74) *Attorney, Agent, or Firm* — Steven C. Bauman

(57) ABSTRACT

Photocurable compositions and methods of preparation and use of such compositions. More particularly, photocurable compositions useful for forming topographical features on surfaces such as membrane surfaces. Methods of forming topographical features on a membrane surface using photocurable compositions.

14 Claims, 3 Drawing Sheets

Related U.S. Application Data

(60) Provisional application No. 62/649,174, filed on Mar. 28, 2018.

(51) Int. Cl.

| | | |
|---|---|---|
| *B01D 69/02* | (2006.01) | |
| *B05D 1/32* | (2006.01) | |
| *B05D 3/06* | (2006.01) | |
| *C02F 1/44* | (2023.01) | |
| *C08K 3/22* | (2006.01) | |
| *C08K 3/26* | (2006.01) | |
| *C08K 3/36* | (2006.01) | |
| *C08L 75/16* | (2006.01) | |

(52) U.S. Cl.
CPC ............... *B01D 69/02* (2013.01); *B05D 1/32* (2013.01); *B05D 3/067* (2013.01); *C02F 1/441* (2013.01); *C08K 3/22* (2013.01); *C08K 3/26* (2013.01); *C08K 3/36* (2013.01); *B01D 2313/14* (2013.01); *B01D 2323/345* (2013.01); *B01D 2325/021* (2013.01); *B01D 2325/08* (2013.01); *C08K 2003/2227* (2013.01); *C08K 2003/265* (2013.01)

(58) Field of Classification Search
CPC ........ B01D 2323/345; B01D 2325/021; B01D 2321/343; B01D 67/0088; C08L 75/16; B05D 1/32; B05D 3/067; B05D 1/28; B05D 3/06; C02F 1/441; C08K 3/22; C08K 3/26; C08K 3/36; C08K 2003/2227; C08K 2003/265; B08B 17/065

See application file for complete search history.

(56) References Cited

U.S. PATENT DOCUMENTS

| | | |
|---|---|---|
| 5,384,685 A | 1/1995 | Tong et al. |
| 5,395,862 A | 3/1995 | Neckers et al. |
| 5,451,343 A | 9/1995 | Neckers et al. |
| 5,545,676 A | 8/1996 | Palazzotto et al. |
| 5,607,566 A | 3/1997 | Brown et al. |
| 6,632,357 B1 | 10/2003 | Barger et al. |
| 6,720,395 B2 | 4/2004 | Nakagawa |
| 7,311,831 B2 | 12/2007 | Bradford et al. |
| 7,351,477 B2 | 4/2008 | Yamaya et al. |
| 7,781,494 B2 | 8/2010 | Okada et al. |
| 2003/0167633 A1* | 9/2003 | Rutiser ............... H01L 21/56 29/841 |
| 2004/0011723 A1* | 1/2004 | Bradford ............ B01D 69/00 210/493.4 |
| 2010/0118642 A1 | 5/2010 | Clifford et al. |
| 2012/0041092 A1 | 2/2012 | Bohannon |
| 2014/0243444 A1 | 8/2014 | Ikari et al. |
| 2015/0182993 A1* | 7/2015 | Binner ............... B41F 15/40 118/301 |
| 2018/0178503 A1* | 6/2018 | Shuey ............... C08K 5/10 |
| 2018/0207589 A1* | 7/2018 | Martinez ............ B01D 61/44 |

FOREIGN PATENT DOCUMENTS

| | | |
|---|---|---|
| EP | 0563925 | 10/1993 |
| EP | 2868692 | 5/2015 |
| JP | 5733304 | 6/2015 |
| JP | 2017009780 A | 1/2017 |
| WO | 02066571 | 8/2002 |
| WO | 2014/134229 | 9/2014 |
| WO | 2015110827 | 7/2015 |
| WO | 2015110828 | 7/2015 |
| WO | 2016077984 | 5/2016 |
| WO | 2016160410 | 10/2016 |
| WO | 2017013398 | 1/2017 |
| WO | 2017139535 | 8/2017 |

OTHER PUBLICATIONS

Zhang, J. et al (2017). Novel Waterborne UV-Curable Hyperbranched Polyurethane Acrylate/ Silica with Good Printability and Rheological Properties Applicable to Flexographic Ink. ACS Omega. 2. 7546-7558. 10.1021/acsomega.7b00939.

* cited by examiner

PHOTOCURABLE COMPOSITIONS AND METHOD OF FORMING TOPOGRAPHICAL FEATURES ON A MEMBRANE SURFACE USING PHOTOCURABLE COMPOSITIONS

BACKGROUND

Field

The present invention relates to photocurable compositions and methods of preparation and use of such compositions. More particularly, the present invention relates to photocurable compositions useful for forming topographical features, e.g., spacer features, on surfaces such as membrane surfaces, and particularly on membranes used in osmosis and reverse-osmosis applications, such as membrane filters.

Brief Description Related Technology

Curable compositions have been used widely for sealing, adhesive, coating and potting applications, to name a few. The choice of the type backbones and curable groups is generally selected with reference to the specific end use application and the environment in which it is intended to be used. Polymers having various degrees of unsaturated groups, as well as other functionally crosslinking groups have been used.

Formation of spacer features on filtration devices and osmosis membranes used in such devices is known. The use of curable composition patterns printed onto membrane surfaces serve as replacements for more conventional mesh layers which allow liquid, such as water, to flow and also to keep the filtration membranes apart by providing a spacing function. The formation of curable composition patterns on a membrane has been discussed as having distinct advantages over mesh layers, particularly because the patterns provide less obstruction of flow and less build-up of filter debris (commonly referred to as fouling). Moreover, spacers placed directly on the surface of the membrane may have a height reduced by 50% when compared to a convention mesh spacer. A smaller spacer height in a traditional mesh would not be possible as it would dramatically increase feed pressure as well as pressure drop across the element. The smaller height of the printed spacers does not appear to reduce feed pressure significantly. The benefit of the smaller printed spacer height is that it allows for more membrane to be rolled into the element to produce the same specified diameter as the traditional mesh at a greater spacer height. For example, in certain instances, the printed spacers allow for 7 additional leaves to be utilized, for a total of 35 leaves rather than the traditional 28 leaves in the same 8 inch diameter element (i.e., 25% more). In other cases, 3 more leaves may be added, for a total of 10 leaves rather than the typical 7 leaves in a 4 inch diameter element (i.e., 40% more).

There are many difficulties in manufacturing, on a commercial scale, membranes having printed curable composition patterns, i.e. referred to herein as topographical features. The topographical feature must have a size and shape which provides sufficient spacing from the adjacent layer, balanced with a minimum coverage of the surface area of the membrane to allow a maximum of fluid flow.

Moreover, many curable compositions cannot meet the requirements in terms of chemical and temperature resistance to hold up to the cleaning cycles required for these applications. In addition, the curable composition is required to have high bond strengths to the membrane while also not being too brittle to damage the membrane during rolling or too soft and flexible that will compress and lose the specified spacing required while under pressure in use.

While UV inks are capable of high aspect ratios and fast cures, they are limited by how high they can print in a single pass. Generally, many passes of curable composition deposition are required over the same area to build the heights required for these applications, which dramatically slows the printing speed and production of the final product. Standard light cure acrylics (LCA's) or even gel LCA's are not able to meet the requirements necessary for achieving certain heights as they have low aspect ratios. If jet printing is used (jetting) the impact velocity of the curable composition when it hits the membrane further reduces the aspect ratio. Jetting is able to double the print speeds, but at a great loss to the aspect ratio.

Polyolefin (PO) hot melt curable compositions with gravure printing allows very fast production speeds of printed membranes, however, it has the slowest cure speed due to cooling, which can take 30 seconds or more, and which requires larger accumulation space to not damage the pattern. The PO hot melt's aspect ratio is not adequate when used at the high viscosities necessary for gravure printing. Print height is limited to maximum print height possible by a single print pass because multiple prints passes are not possible using this technique. Accordingly, the aspect ratio is limited by the limited print height. Moreover, the PO hot melt process is prone to stringing and long start-up times with large membrane waste, which is very expensive in this market/application. Thus, in this market, the PO hot melt process is not an efficient process.

There is a need for a curable composition and a process of using such composition which allows for high speed printing of topographical features on surfaces such as membranes, the curable composition being light curable and possessing rheological properties that allow for a volume of the curable composition to substantially maintain its dimensions once applied, as well as during the removal of the template in the application of the curable composition to the membrane surface.

SUMMARY

The present invention provides a means of satisfying the above-mentioned need. The present invention provides photocurable compositions (i.e., light curable compositions) and methods of preparation and use of such compositions. More particularly, the present invention relates to photocurable compositions useful for forming topographical features on surfaces such as membrane surfaces.

In one aspect of the invention there is provided a method of forming topographical features on a membrane surface including the steps of: providing a membrane surface; providing a stencil or screen over the membrane surface, the stencil or screen having openings exposing the membrane surface for receiving a curable composition; depositing one or more layers of curable composition into the stencil openings or screen openings and onto the membrane surface to form the topographical features, the openings defining an approximate shape and size of the topographical features; removing the stencil or screen to leave in place the topographical features on the membrane; and curing the curable composition, wherein a single layer of the curable composition deposited in the depositing step produces topographical features have an aspect ratio (height/width) from about 0.2 to about 2.

In another aspect of the present invention, there is provided a method of forming topographical features on a membrane surface including the steps of: providing a membrane surface; providing a stencil or screen over the membrane surface, the stencil or screen having openings exposing the membrane surface for receiving a curable composition; depositing one or more layers of curable composition into the stencil openings or screen openings and onto the membrane surface to form the topographical features, the openings defining an approximate shape and size of the topographical features; and removing the stencil or screen to leave in place the topographical features on the membrane; wherein the Thixotropic index (TI) (viscosity at 1 $s^{-1}$/viscosity at 10 $s^{-1}$) of the curable composition is about 2 to about 15, and the curable composition provides a topographical features aspect ratio (height/width) sufficient to substantially maintain the approximate size and shape of the feature during removal of the stencil from the membrane surface prior to cure.

In a further aspect of the present invention, there is provided a light curable composition including: a light curable component comprising a backbone selected from the group consisting of (meth)acrylates, epoxies, polyisobutenes (PIB), polyurethanes (PU), polyolefins (PO), ethylvinylacetates (EVA), polyamides (PA) and combinations thereof; and a light curing moiety; a cure system; and rheology modifying component present in an amount of about 2% to about 50% by weight of the total curable composition; wherein the curable composition has a Thixotropic Index (TI) (cp at 1 $s^{-1}$/cp at 10 $s^{-1}$) of between about 2 and about 15.

In yet another aspect of the present invention, there is provided a reverse osmosis filter including: a water permeable membrane having a pattern of curable composition spacers printed thereon, wherein the curable composition spacers are formed from a light curable composition with viscosity of 10,000 to 500,000 centipoise (cP) at 10 $s^{-1}$, a Thixotropic Index (TI) (viscosity at 1 $s^{-1}$/viscosity at 10 $s^{-1}$) of between about 2 and about 15, wherein the spacers are formed by stencil printing or screen printing one or more spacer layers having an aspect ratio (height/width) between about 0.2 and about 2.

In still another aspect of the present invention, there is provided a method of manufacturing a filtration membrane having printed curable composition spacers including the steps of: providing a membrane have a first surface and an opposing second surface; and depositing a light curable composition onto the first and/or second membrane surface(s) to form spacer features having a defined shape and size; wherein the light curable composition has viscosity of 10,000 to 500,000 centipoise (cP) at 10 $s^{-1}$, a Thixotropic Index (TI) (viscosity at 1 $s^{-1}$/viscosity at 10 $s^{-1}$) of between about 2 and about 15 and wherein the aspect ratio (height/width) of the curable composition is between about 0.2 and about 2.

BRIEF DESCRIPTION OF THE DRAWINGS

FIG. 2a shows the stencil overlaid on the membrane surface and FIG. 2b shows the stencil and membrane separated from one another after the stencil has been removed from the membrane leaving the topographical features.

DETAILED DESCRIPTION

The present invention is directed to photocurable compositions and methods of preparation and use of such compositions. More particularly, the present invention relates to photocurable compositions useful for forming topographical features on surfaces such as membrane surfaces.

A method of forming topographical features on a membrane surface according to the present invention includes the steps of: providing a membrane surface; providing a stencil or screen over the membrane surface, the stencil or screen having openings exposing the membrane surface for receiving a curable composition; depositing one or more layers of curable composition into the stencil openings or screen openings and onto the membrane surface to form the topographical features, the openings defining an approximate shape and size of the topographical features; removing the stencil or screen to leave in place the topographical features on the membrane; and curing the curable composition, wherein a single layer of the curable composition deposited in the depositing step produces topographical features have an aspect ratio (height/width) from about 0.2 to about 2.

Another method of forming topographical features on a membrane surface according to the present invention includes: the steps of: providing a membrane surface; providing a stencil or screen over the membrane surface, the stencil or screen having openings exposing the membrane surface for receiving a curable composition; depositing one or more layers of curable composition into the stencil openings or screen openings and onto the membrane surface to form the topographical features, the openings defining an approximate shape and size of the topographical features; and removing the stencil or screen to leave in place the topographical features on the membrane; wherein the viscosity of the curable composition is 10,000 to 500,000 centipoise (cP) at 10 $s^{-1}$, Thixotropic index (TI) (viscosity at 1 $s^{-1}$/viscosity at 10 $s^{-1}$) is about 2 to about 15, and the curable composition provides a topographical features aspect ratio (height/width) sufficient to substantially maintain the approximate size and shape of the feature during removal of the stencil from the membrane surface prior to cure.

The methods of the present invention may be carried out using high speed production printing methods known in the art. Preferably, the methods of the invention employ direct printing via stencil/screen or gravure printing methods.

Figure 2A:
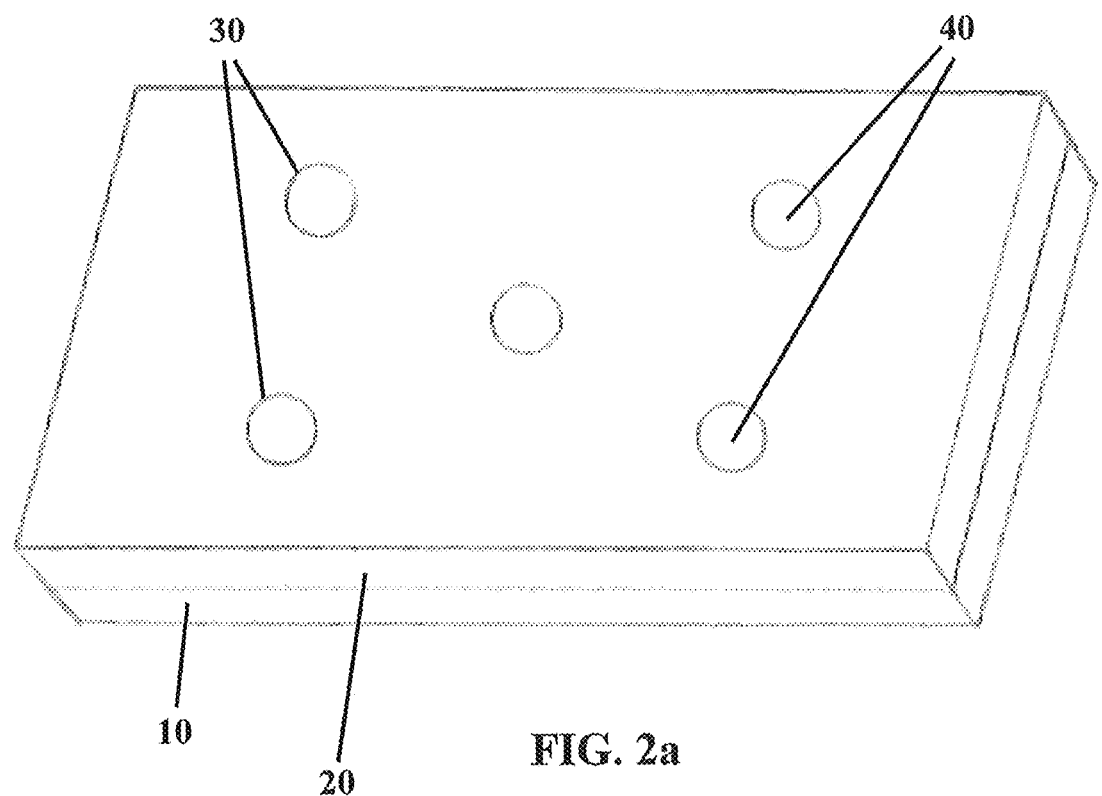
FIGS. 2a and 2b show a stencil and membrane arrangement, with openings for deposition of a curable composition, on a membrane surface, in the form of topographical features (showing three dimension) having a desired size and shape, the topographical features being sufficient to perform a spacing function when layered with other membrane surfaces. The aspect ratio (which provides for a desired spacing capability) of the features is shown.
Figure 2B:
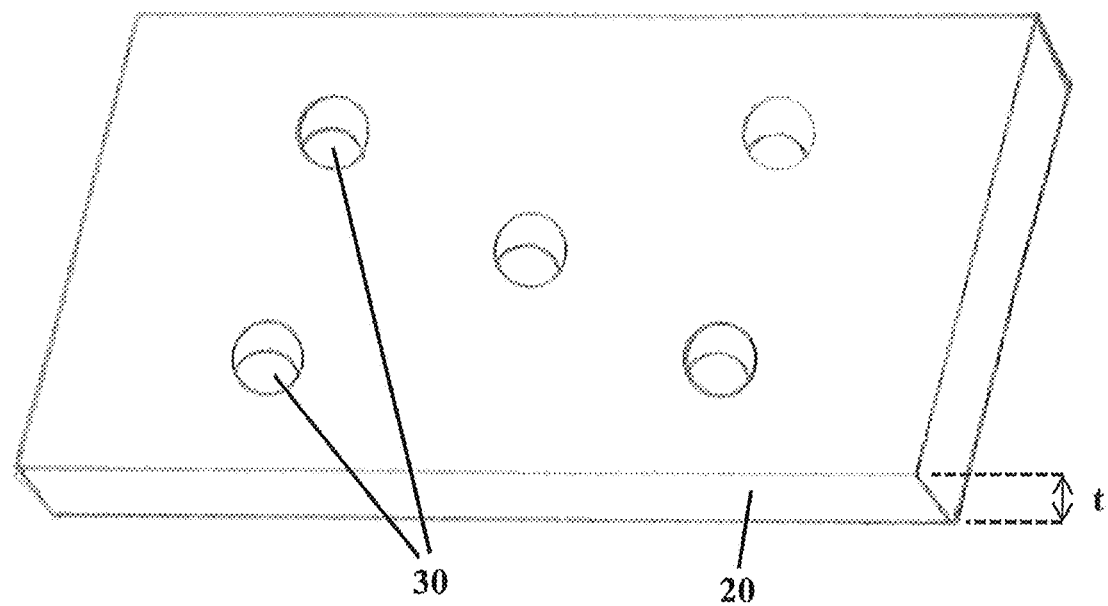
Figure 2B:
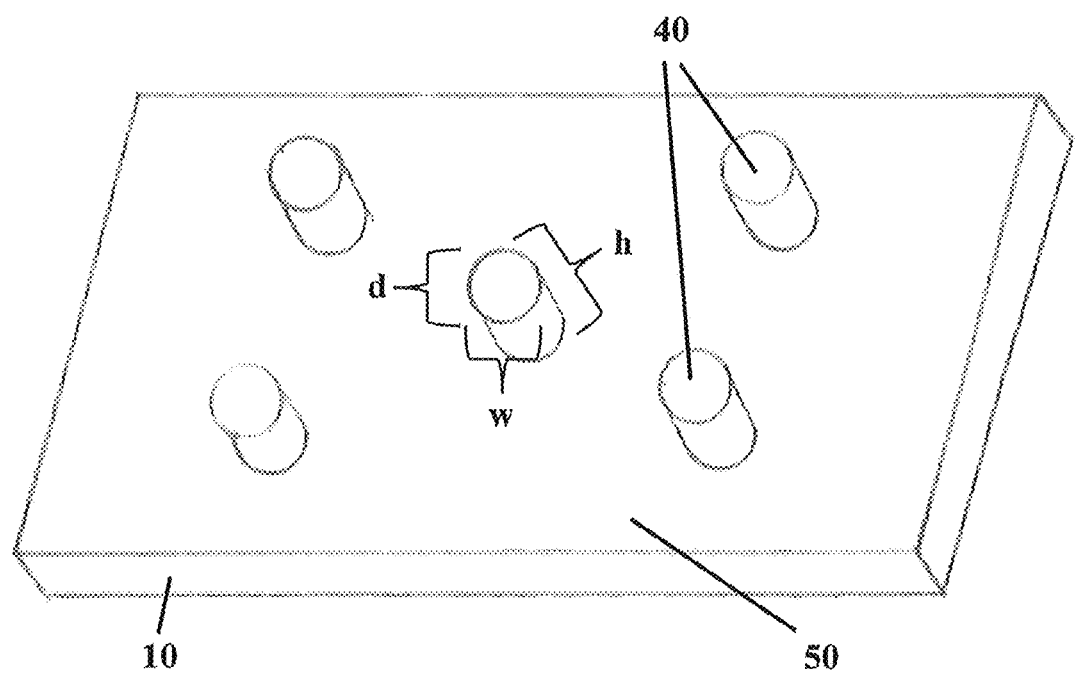

As shown in FIG. 2a, the membrane (10) is overlaid with the stencil (20) on one of the membrane's surfaces (not shown). The openings (30) in the stencil are filled with curable composition to form the topographical features (40). As shown in FIG. 2b, when the stencil (20) is removed from the membrane (10) the topographical features (40) formed from the curable composition are left attached to the membrane surface (50).

The topographic features formed on the membrane surface by the methods of the present invention have physical characteristics that make them suitable for providing spacing between overlaid layers of the membrane. For example, the topographic features may provide adequate spacing between layers of a spiral reverse osmosis filtering membrane to optimize the operation, cleaning, and lifespan of reverse osmosis membrane elements employing membranes with these topographical features. Moreover, the topographical features are typically smooth or flat, with no sharp edges that may damage the mating layer of membrane during operation.

The aspect ratio of the topographical features may be greater than 0.50 or greater than about 0.70. A combination of aspect ratios may be used in a pattern to provide a specified spacing configuration between layers of membrane or other surfaces in the osmosis devices of the invention. As used herein, the term "aspect ratio" means the ratio of the height of the topographical features to the width of the topographical features.

The height of the topographical features once formed on the membrane may be from about 0.001 to about 0.05 inches, such as from about 0.01 to about 0.04 inches. The height of a topographical feature is the distance from the base of the topographical feature (on the membrane surface or the interface between the topographical feature and the membrane) to the point on the topographical feature that is farthest perpendicularly from the membrane surface.

The width of the topographical feature is defined as the minimal dimension of a topographical feature footprint on a membrane surface, wherein the footprint is area or region of coverage on the substrate surface.

The pattern of topographical features may have a size and shape sufficient to maintain adequate membrane spacing and to expose sufficient membrane surface to ensure efficient operation of the membrane. In particular, the total surface area of the membrane covered by the topographical features (i.e., area of the footprint of the individual topographical features multiplied by the number of topographical features per unit area of the membrane surface) is not more than about 20% of the surface of the membrane (i.e., at least about 80% of the membrane surface remains exposed). The total surface area of the membrane covered by the topographical features is not more than about 15%, such as not more than about 10%, or not more than about 6%, or not more than about 5%, or not more than about 3%, or note more than about 2%, or not more than about 1%.

The pattern of topographical features may be formed on the membrane surface at speeds of about 0.5 m$^2$/minute or greater. The pattern of topographical features may be formed on the membrane surface at speeds of about 1 m$^2$/minute or greater or at speeds of about 2 m$^2$/minute or greater.

The printing speed of the topographical features may also be optimized because the desired height may be achieved while only depositing a single layer of curable composition without adversely affecting the aspect ratio and the overall membrane efficiency (as opposed to having to coat and cure 10-20 layers of UV Ink, for example.) Moreover, this single layer of deposition is also carried out over the entire 40 inch width of the membrane simultaneously. Thus, the time for printing a single leaf is the linear rate of travel down the length of the leaf (also 40 inches). Accordingly, there is no need for travel in both the X and Y direction with multiple passes. Essentially, there is no need to deposit multiple layers of curable composition to achieve the desired height prior to curing or pre-curing on the membrane. This offers significant speed advantage over other technologies. By way of example, UV inks deposit maximum of 0.001 inch of height per pass. The processes can in the wet printing method deposit 10 times that, i.e., up to 0.010 inch per pass and the pre-cure method can deposit 40 times that, i.e., up to of 0.040 inch per pass. The processes are also capable of depositing less than the maximum heights in a single pass for full flexibility in topographical feature design.

The surface upon which the topographical features are deposited may include any surface though a membrane surface is most suitable. As used herein, a "membrane" means a selective barrier that allows passage of some substances but prevents passage of other substances. The membrane may be a filter membrane, i.e., a membrane for filtering substances out of a liquid carrier, such as water. Filter membranes include reverse osmosis membranes, forward osmosis membranes, microfiltration membranes, ultrafiltration membranes, and nanofiltration membranes. The topographical features may be printed on the active surface of the membrane, or on the non-active surface of the membrane, or both. The filter membranes may be used in the assembly of devices used in energy production, such as by reverse electrodialysis or pressure retarded osmosis (e.g., salinity gradient power generation or osmotic power generation).

The curable composition may be deposited into and/or through the stencil or screen openings and onto the membrane surface to form the topographical features by depositing a single layer of the curable composition. The curable composition may be deposited into and/or through the stencil or screen openings and onto the membrane surface to form the topographical features by depositing multiple layers of the curable composition. The topographical features may be deposited on one surface (either the feed side or permeate side) or both surfaces of the membrane.

The stencil or screen may be constructed from any useful material that allows for adequate sealing of the stencil to the surface to prevent the curable composition from bleeding onto the portion of the surface covered by the stencil and also allow for removal of the stencil from the surface without damaging the surface or disturbing the deposited curable composition. The stencil or screen may be constructed from a metal, such as steel, aluminum, stainless steel, polymer coated metal, ceramic coated metal, metal fabric, composite materials, polymeric materials, such as polyester or fluoropolymers, or polymer fabric.

A stencil printing method uses a stencil made from a single sheet of material in which a pattern is cut. The stencil is mounted into a frame and may also be mounted to a frame with a mesh to provide tightness, flatness and spring. The mesh may be constructed of any suitable material, for example stainless- steel, nylon, plastic, carbon fiber, or the like. The thickness of the stencil will be the height of the feature being printed, minus the effects of gravity and physics that reduce the height by a certain factor during printing (typically about 20%). The pattern and openings size (apertures) also determine how much product can be released out of a maximum thickness stencil. A stencil with a superior surface with low surface energy will provide higher release from the stencil. The wet printing method is limited to a height about 20% lower than the stencil thickness. However, in the pre-cure method, using the stencil as a mold, the product pre-cures to the height of the stencil. Thus, the features can be released from the apertures of the stencil because the curable composition is not fully cured and due to the low surface energy coating of the stencil. After the curable composition is fully cured, the height of the features is the same as the height of the stencil.

A screen printing method uses a stainless-steel mesh or a polyester or Nylon screen, which has an emulsion applied thereon to cover portions of the screen or mesh and expose a pattern into which the curable composition is deposited. Print thickness is dependent on the mesh thickness, mesh open area, and emulsion build-up thickness. Thickness is also affected by printer variables such as squeegee pressure and durometer, angle of attack, speed, and snap-off distance. The viscosity of printing materials may vary from low to high depending on the application needs.

Figure 1:
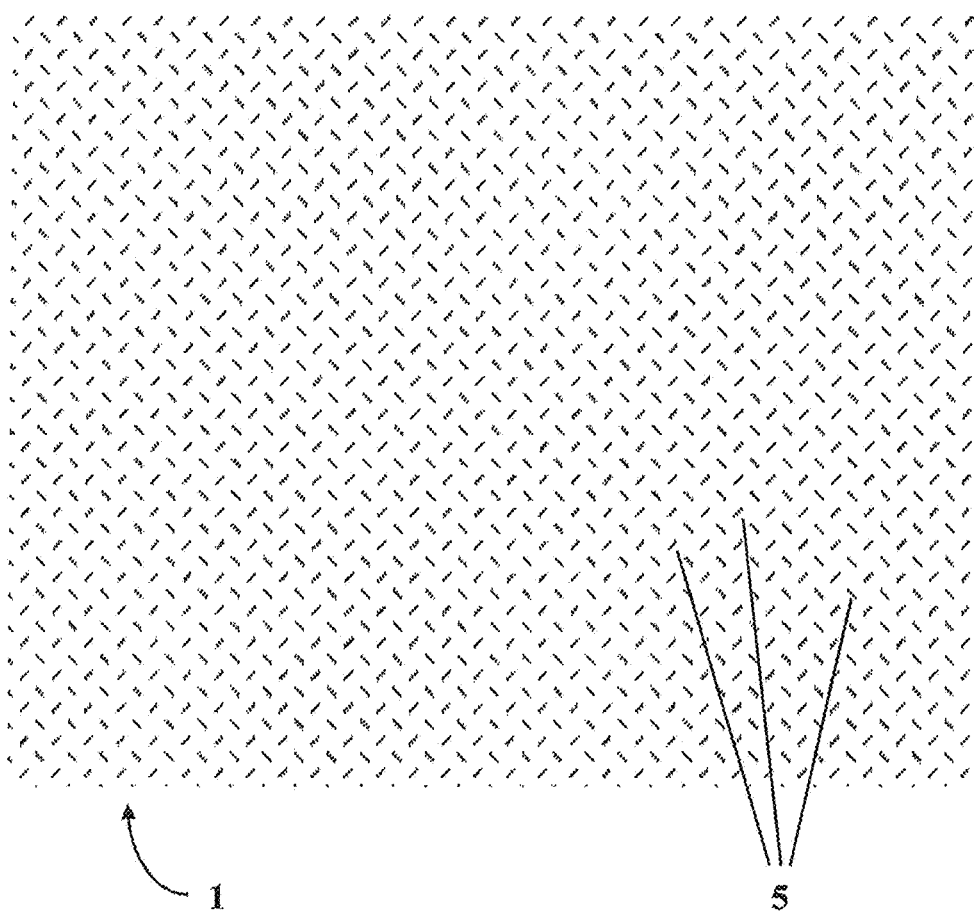
FIG. 1 depicts a typical pattern of topographical features for desalination of water or filtration of brackish water.

The openings or apertures in the stencil or screen pattern of the present invention may take any shape or combination of shapes required to produce a desired shape for the topographical features. For example, the openings may be shaped as circles, ovals, arcs, squares, rectangles, diamonds, pentagons, hexagons, stars, chevrons, or any combination thereof. Such opening shapes produce three dimensional topographical features having a cross-section corresponding to the shape(s) of the openings and having the height and aspect ratio described herein. For example, a circular opening will produce a cylindrical topographical feature. An example topographical of a feature pattern for desalination of water or filtration of brackish water is shown in FIG. 1. The depth of the stencil will determine the height of the topographical feature and is chosen for the desired height in accordance with the aspect ratios desired. For example, the heights may be from about 0.005 to about 0.04 inches and desirably about 0.010 to about 0.025 inches, more preferably from about 0.012 to about 0.015 inches.

The topographical features may be substantially free of sharp edges after formation and removal of the stencil. For example, the edges of the openings of the stencil may be free of any sharp edges so that the deposited curable composition does not have sharp edges. Moreover, when the stencil or screen is removed the curable composition does not pull up with the stencil or screen causing sharp edges on the topographical feature. Essentially, the curable composition slumps enough to maintain a rounded or flat surface, but the curable composition does not slump enough to lose the aspect ratio. In addition, the stencil coating is chosen to have low enough surface energy to avoid pulling the curable composition when the stencil or screen is removed. Thus, the topographical features are typically smooth or flat, with no sharp edges that may damage the mating layer of membrane during operation.

The curable composition is capable of producing the thixotropic index values and aspect ratios as described herein, as well as being light curable and suitable for use in the high speed production printing methods. The curable compositions should have properties that make them suitable for the high speed production printing methods described herein and known in the art. For example, the curable compositions should provide for fast cure speeds, desirable rheological properties, superior adhesion, chemical/temperature resistance, and flexibility/durability to meet the various membrane application requirements.

The curable composition should have an optimized rheology that is effectively balanced to allow for shear thinning to flow through a screen or into the stencil printer but maintain its three dimensional print dimensions, e.g. height, width and depth (and thus maintain its overall shape), after the screen or stencil is removed to provide the aspect ratios described herein. Essentially, the curable composition of the present invention must exhibit a sufficient thixotropy to maintain its physical structure, and not run or sag, prior to cure. Moreover, when sheer force is applied (e.g., during depositing into the stencil or screen) the curable composition's viscosity is lower, which aids in the curable composition moving through/filling the openings in the stencil or screen. As used herein, "thixotropy" means that the substance becomes less viscous when stress (for example mixing or shaking) is applied and is more viscous when free of such stress (e.g., under static conditions).

Generally, the curable composition should be capable of being deposited into the stencil openings and onto the membrane surface, and once deposited and allowed to become static, capable of maintaining its shape during removal of the stencil and during curing.

The curable composition should have a thixotropic index (TI) of from 2 to about 12, preferably from about 5 to about 10, and more preferably from about 6 to about 8. The TI should be greater than about 2, greater than about 4, greater than about 6, greater than about 7, greater than about 8, greater than about 9, greater than about 10, or greater than about 11. As used herein, the "thixotropic index" means the ratio of the viscosity (in centipoise) of the curable composition at a speed of 1 sec-1 to the viscosity (in centipoise) of the curable composition at a speed of 10 sec-1 (viscosity at $1\ s^{-1}$/viscosity at $10\ s^{-1}$).

The curable composition should have a viscosity (in centipoise) at a speed of $10\ s^{-1}$ of about 10,000 to about 500,000. The viscosity may be determined using known methods, for example, cone and plate rheometer, parallel plate rheometer, or rotation viscometer, such as Brookfield viscometer.

The curable composition should have a cure speed of about 5 seconds or less. The curable composition should have a cure speed of about 4 seconds or less, about 3 seconds or less, about 2 seconds or less, about 1 seconds or less.

The curable composition may be a photocurable or light curable composition, i.e., curable when exposed to radiation in the electromagnetic spectrum, such as by using light such as visible or ultraviolet light (UV). Thus, the curable composition may be cured using a light source, such a bulb or LED that produces visible or UV light. The curable composition is at least partially cured by exposing the side of the membrane without the topographical features to the light source, typically a visible light source.

The curable composition may be fully cured before or after the removal of the stencil or screen.

The curable composition may also be pre-cured, i.e., partially cured, prior to removal of the stencil. Here, this partial curing is produced by exposing the side of the membrane without the topographical features to a visible light source. After the removal of the stencil or screen, the curable composition may then be fully cured using a UV or visible light source.

In this pre-cure method, the viscosity of the curable composition is increased prior to removal of the stencil or screen to aid in maintaining the shape of the topographical features during removal of the stencil. In some instances, this pre-curing gels the curable composition or partially cures the curable composition to a semi-solid state. As discussed above, the stencil or screen is made from a coated metal that provides a low surface energy to allow the release of the curable composition from the stencil via the limited adhesion created to the membrane during the pre-cure.

This pre-cure method allows for dramatically improved aspect ratios over wet printing as it can achieve any height desired in one step (i.e., 0.005-0.040 inches), instead of requiring deposition of multiple layers to reach the necessary height).

There is also provided a light curable composition including a light curable component comprising a backbone selected from (meth)acrylates, epoxies, polyisobutenes (PIB), polyurethanes (PU), polyolefins (PO), ethylvinylacetates (EVA), polyamides (PA) and combinations thereof; and a light curing moiety; a cure system; and rheology modifying component present in an amount of about 2% to about 50% by weight of the total curable composition. The curable composition should have a viscosity of about 10,000 to about 500,000 centipoise (cP) at 10 s$^{-1}$, and a Thixotropic Index (TI) (viscosity at 1 s$^{-1}$/viscosity at 10 s$^{-1}$) of between about 2 and about 15.

Materials used to make polymer backbones for the light curable compositions include, but are not limited to, (meth) acrylates such as (meth)acrylic acid, methyl (meth)acrylate, ethyl (meth)acrylate, n-propyl (meth)acrylate, isopropyl (meth)acrylate, n-butyl (meth)acrylate, isobutyl (meth) acrylate, tert-butyl (meth) acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth) acrylate, nonyl (meth)acrylate, decyl (meth)acrylate, dodecyl (meth)acrylate, phenyl (meth)acrylate, tolyl (meth) acrylate, benzyl (meth)acrylate, 2-methoxyethyl (meth) acrylate, 3-methoxybutyl (meth) acrylate, 2-hydroxyethyl (meth) acrylate, 2-hydroxypropyl (meth) acrylate, stearyl (meth) acrylate, glycidyl (meth) acrylate, 2-aminoethyl (meth) acrylate, γ-(methacryloyloxypropyl)trimethoxysilane, (meth)acrylic acid-ethylene oxide adduct, trifluoromethylmethyl (meth)acrylate, 2-trifluoromethylethyl (meth) acrylate, 2-perfluoroethylethyl (meth) acrylate, 2-perfluoroethyl-2-perfluorobutylethyl (meth) acrylate, 2-perfluoroethyl (meth) acrylate, perfluoromethyl (meth) acrylate, diperfluoromethylmethyl (meth) acrylate, 2-perfluoromethyl-2-perfluoroethylmethyl (meth) acrylate, 2-perfluorohexylethyl (meth) acrylate, 2-perfluorodecylethyl (meth) acrylate, 2-perfluorohexadecylethyl (meth)acrylate, etc.; styrenic monomers such as styrene, vinyltoluene, α-methylstyrene, chlorostyrene, styrenesulfonic acid and its salt; fluorine-containing vinyl monomers such as perfluoroethylene, perfluoropropylene, vinylidene fluoride, etc.; silicon-containing vinyl monomers such as vinyltrimethoxysilane, vinyltriethoxysilane, etc.; maleic anhydride, maleic acid, monoalkyl esters and dialkyl esters of maleic acid; fumaric acid and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide, etc.; nitrile-containing vinyl monomers such as acrylonitrile, methacrylonitrile, etc.; amide-containing vinyl monomers such as acrylamide, methacrylamide, etc.; vinyl esters such as vinyl acetate, vinyl propionate, vinyl pivalate, vinyl benzoate, vinyl cinnamate, etc.; alkenes such as ethylene, propylene, etc.; conjugated dienes such as butadiene, isoprene, etc.; vinyl chloride, vinylidene chloride, allyl chloride and allyl alcohol. These monomers may be used each alone or a plurality of them may be copolymerized.

Suitable examples of epoxies useful for making or incorporating into the backbones of the light curable compositions include, but are not limited to, bisphenol A epoxies, bsiphenol F epoxies, novolac epoxies, aliphatic epoxies, glycidylamine epoxies, and cycloaliphatic epoxies.

Suitable examples of polyisobutenes (PIB) useful for making or incorporating into the backbones of the light curable compositions include, but are not limited to, polyisobutylene diacrylate as described in U.S. Patent Application Publication No. 2014/0243444A1.

Suitable examples of polyurethanes (PU) useful for making or incorporating into the backbones of the light curable compositions include, but are not limited to, polyester urethane acrylate and polyether urethane acrylate.

Suitable examples of polyolefins (PO) useful for making or incorporating into the backbones of the light curable compositions include, but are not limited to, UC-102M and UC-203M by Kuraray, polyethylacrylate and polybutylacrylate as described in U.S. Pat. Nos. 7,781,494 and 6,720,395.

The light curing moiety is attached to the polymer backbone, desirably but not necessarily, at the terminal ends of the polymer backbone, and maybe be any chemical moiety or group which when exposed to actinic radiation, such a LED, visible or UV light, cures via a crosslinking reaction. For example, vinyl groups, (meth)acrylate, and epoxy groups.

The light curable component includes a material selected from a urethane (meth)acrylate and a (meth)acylate.

The cure system includes at least one cure initiator, and optionally, a sensitizing compound capable of absorbing radiation in the appropriate range of about 300-1000 nm and/or an electron donor. The cure initiator (or, photoinitiator), may be a UV initiator, a visible initiator or a combination of UV and visible initiators.

A variety of UV initiators may be employed. UV initiators are generally effective in the range of about 200 to about 400 nm, and particularly in the portion of the spectrum that borders on the visible portion of greater than about 200 nm to about 390 nm.

Initiators that respond to UV radiation to initiate and induce curing of the (meth)acryl functionalized curable component, which are useful in the present invention include, but are not limited to, benzophenone and substituted benzophenones, acetophenone and substituted acetophenones, benzoin and its alkyl esters, xanthone and substituted xanthones, phosphine oxides, diethoxy-acetophenone, benzoin methyl ether, benzoin ethyl ether, benzoin isopropyl ether, diethoxyxanthone, chloro-thio-xanthone, N-methyl diethanol-amine-benzophenone, 2-hydroxy-2-methyl-l-phenyl-propan-1-one, 2-benzyl-2-(dimethylamino)-1-[4-(4-morpholinyl)phenyl]-1-butanone and mixtures thereof.

Examples of such UV initiators include initiators available commercially from IGM Resins under the "IRGACURE" and "DAROCUR" tradenames, specifically "IRGACURE" 184 (1-hydroxycyclohexyl phenyl ketone), 907 (2-methyl-1-[4- (methylthio)phenyl]-2-morpholino propan-l-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-l-phenyl-propan-1-one), and 819 [bis(2,4,6-trimethyl benzoyl)phenyl phosphine oxide], and "DAROCUR" 1173 (2-hydroxy-2-methyl-1-phenyl-1-propane) and 4265 (the combination of 2,4,6-trimethylbenzoyldiphenyl-phosphine oxide and 2-hydroxy-2-methyl-1-phenyl-propan-1-one); and 2,4,6-trimethylbenzoyldiphenylphosphine oxide (commercially available as LUCIRIN TPO from BASF Corp.). Of course, combinations of these materials may also be employed herein. Of course, it is understood that some of these photoinitiators categorized herein as UV photoinitiators have a tailing absorption into the visible range, and thus straddle the line between UV and visible light cure initiators, but nonetheless are included herein as part of the invention.

Initiators suitable for use that respond to visible light to initiate and induce curing include, but are not limited to, camphorquinone peroxyester initiators, 9-fluorene carboxylic acid peroxyesters, visible light [blue] photoinitiators, d1-camphorquinone, "IRGACURE" 784DC (photoinitiator based on substituted titanocenes), and combinations thereof.

Other suitable photoinitiator systems include those disclosed in each of the following patents or publications, each of which is incorporated by reference herein in its entirety. U.S. Pat. No. 4,505,793 to Tamoto et al., which is incorporated by reference herein, discloses photopolymerization initiators that include a combination of a 3-keto-substituted cumarin compound and an active halogeno compound. A number of exemplary compounds are disclosed. Such photopolymerization initiators cure by exposure to light having wavelengths ranging between about 180 nm and 600 nm. U.S. Pat. No. 4,258,123 to Nagashima et al., which is incorporated by reference herein, discloses photosensitive resin compositions including initiator components that generate a free radical upon irradiation with actinic light. Such components include various triazine compounds, as more fully described therein.

Cationic photoinitiators for epoxy cure include diaryliodonium salts, triarylsulfonium salts, and phenacylsulfonium salts. Commercially available cationic photoinitiator include Omnicat 432 (triarylsulfonium hexafluorophosphate salts), Omnicat 440 (4,4'-dimethyl-diphenyl iodonium hexafluorophosphate), and Omnicat 550 (10-biphenyl-4-yl-2-isopropyl-9-oxo-9H-thioxanthen-10-ium hexafluorphosphate).

Additional useful components may be found in European Patent Publication No. EP 0 369 645 A1, which discloses a three-part photoinitiator system which includes a trihalomethyl substituted-s-triazine, a sensitizing compound capable of absorbing radiation in the range of about 300-1000 nm and an electron donor. Exemplary sensitizing compounds are disclosed, including: ketones; coumarin dyes; xanthene dyes; 3H-xanthen-3-one dyes; acridine dyes; thiazole dyes; triazine dyes; oxazine dyes; azine dyes; aminoketone dyes; methane and polymethine dyes; porphyrins; aromatic polycyclic hydrocarbons; p-substituted aminostyryl ketone compounds; aminotriaryl methanes; merocyanines; squarylium dyes; and pyridinium dyes. Exemplary donors also are disclosed, including: amines; amides; ethers; ureas; ferrocene; sulfinic acids and their salts; salts of ferrocyanide; ascorbic acid and its salts; dithiocarbamic acid and its salts; salts of xanthates; salts of ethylene diamine tetraacetic acid; and salts of tetraphenylboronic acid. Such initiators are sensitive to both UV and visible light.

Additional useful components may be found in European Patent Publication No. EP 0 563 925 A1, which discloses photopolymerization initiators including a sensitizing compound that is capable of absorbing radiation in the range of about 250-1000 nm and 2-aryl-4,6-bis(trichloromethyl)-1,3, 5-triazine. Exemplary sensitizing compounds that are disclosed include: cyanine dye, merocyanine dye, coumarin dye, ketocoumarin dye, (thio)xanthene dye, acridine dye, thiazole dye, thiazine dye, oxazine dye, azine dye, aminoketone dye, squarylium dye, pyridinium dye, (thia)pyrylium dye, porphyrin dye, triaryl methane dye, (poly)methane dye, amino styryl compounds and aromatic polycyclic hydrocarbons. These photopolymerization initiators are sensitive to UV and visible light.

U.S. Pat. No. 5,395,862 to Neckers et al., which is incorporated by reference herein, discloses fluorone photoinitiators, which are sensitive to visible light. Such fluorone initiator systems also include a coinitiator, which is capable of accepting an electron from the excited fluorone species. Exemplary coinitiators are disclosed, including: onium salts, nitrohalomethanes and diazosulfones. U.S. Pat. No. 5,451,343 to Neckers et al., which is incorporated herein by reference, discloses fluorone and pyronin-Y derivatives as initiators that absorb light at wavelengths of greater than 350 nm. U.S. Pat. No. 5,545,676 to Palazzotto et al., which is incorporated by reference herein, discloses a three-part photoinitiator system, which cures under UV or visible light. The three-part system includes an arylidonium salt, a sensitizing compound and an electron donor. Exemplary iodonium salts include diphenyliodonium salts. Exemplary sensitizers and electron donors for use in the three-part system also are disclosed. Additionally, the sensitizer is capable of absorbing light in the range of about 300-1000 nm.

The initiators set forth above are for the purposes of illustration only and are in no way meant to limit the initiators that may be used in the present invention. Initiators may be employed in amounts of about 0.1% to about 10% by weight of the total composition. More desirably, the initiator is present in amounts of 0.5% to about 5% by weight of the total composition.

As used herein, "rheology modifying component" means a composition or compound that changes the rheological properties, e.g., viscosity or flow, of the curable composition. Suitable rheology modifying components include organic and inorganic ones. Inorganics include silica, silicate, alumina, asbestos, barium sulphate, calcium carbonate, calcium fluoride, carbon black, clays, diatomaceous earth, feldspar, ferromagnetics, fly ash, glass fibers, gypsum, jute fiber, kaolin, lingnocellulosics, magnesium hydroxide, mica, microcrystalline cellulose, powdered metals, quartz, startch, talc, titanium dioxide, wood flour, wood fibers, and combinations thereof. Organic rheology modifiers include thermoplastic poymers such as polyvinylacetate, polyolefine, nylon fibers. In an aspect of the present invention, the rheology modifying component is present in amounts of about 2% to about 80% by weight based on the total weight of the curable composition. In another aspect of the present invention, the rheology modifying component is present in amounts of about 4% to about 50% by weight based on the total weight of the curable composition. In other aspects of the present invention, the rheology modifying component is present in amounts of about 5%, or about 10%, or about 15%, or about 20% or about 25%, or about 30%, or about 35%, or about 45%, or about 55%, or about 60%, or about 65%, or about 75% weight based on the total weight of the curable composition.

Optional additives, such as, but not limited to, stabilizers, inhibitors, oxygen scavenging agents, fillers, dyes, colors, pigments, adhesion promoters, plasticizers, toughening agents, reinforcing agents, fluorescing agents, wetting agents, antioxidants and combinations thereof also may be included in the compositions of the present invention.

The curable composition, once cured, should lose less than about 5% weight when submerged in a aqueous solution at a pH range of about 0.5 to about 13.5 at temperatures of from about 25° C. to about 90° C. for in a 6 week period.

The curable composition should be capable of forming and maintaining topographical surface features having an aspect ratio (height/width) of greater than about 0.5 prior to cure.

There is also provided a reverse osmosis filter including a water permeable membrane having a pattern of curable composition spacers printed thereon, where the curable composition spacers are formed from a light curable composition which viscosity of the curable composition is 10,000 to 500,000 centipoise (cP) at 10 s$^{-1}$, a Thixotropic Index (TI) (viscosity at 1 s$^{-1}$/viscosity at 10 s$^{-1}$), of between about 2 and about 15, where the spacers have been formed by stencil printing or screen printing one or more spacer layers having an aspect ratio (height/width) between about 0.2 and about 2.

There is provided a method of manufacturing a filtration membrane having printed curable composition spacers including the steps of providing a membrane have a first surface and an opposing second surface; and depositing a light curable composition onto the first and/or second membrane surface(s) to form spacer features having a defined shape and size; wherein the light curable composition has viscosity of 10,000 to 500,000 centipoise (cP) at 10 s$^{-1}$, a Thixotropic Index (TI) (viscosity at 1 s$^{-1}$/ viscosity at 10 s$^{-1}$) of between about 2 and about 15 and where the aspect ratio (height/width) of the curable composition is between about 0.2 and about 2.

EXAMPLES

Example 1—UV/Visible Light Curable Compositions

Table 1 shows the ingredients of nine UV/visible light curable acrylate compositions. Compositions 1-3 have different amounts of fumed silica as the rheology modifying component. Compositions 4-5 have silica and silicate as rheology modifying components. Composition 6 has precipitated silica as the rheology modifying component. Composition 7, 8 and 9 have calcium carbonate, alumina and micronized polypropylene powder as rheology modifying components, respectively, in addition to silica.

TABLE 1

| | Curable Composition | | | | | | | | |
|---|---|---|---|---|---|---|---|---|---|
| Ingredient | 1 Wt % | 2 Wt % | 3 Wt % | 4 Wt % | 5 Wt % | 6 Wt % | 7 Wt % | 8 Wt % | 9 Wt % |
| Polyester Urethane acrylate | 57.60 | 55.20 | 52.80 | 37.20 | 37.20 | 51.00 | 38.40 | 38.40 | 33.00 |
| Isobornyl acrylate | 26.88 | 25.76 | 24.64 | 17.36 | 17.36 | 23.80 | 17.92 | 17.92 | 18.48 |
| Isodecyl acrylate | 9.60 | 9.20 | 8.80 | 6.20 | 6.20 | 8.50 | 6.40 | 6.40 | 13.20 |
| Irgacure 184 | 0.96 | 0.92 | 0.88 | 0.62 | 0.62 | 0.85 | 0.64 | 0.64 | 0.66 |
| Irgacure TPO | 0.96 | 0.92 | 0.88 | 0.62 | 0.62 | 0.85 | 0.64 | 0.64 | 0.66 |
| Aerosil R202 | 4.00 | 8.00 | 12.00 | 8.00 | 8.00 | | 6.00 | 6.00 | 4.00 |
| Aluminum silicate 325 mesh | | | | 30.00 | | | | | |
| Zirconium silicate 400 mesh | | | | | 30.00 | | | | |
| Zeothix 95 Precipated silica | | | | | | 15.00 | | | |
| Solca 322 acid modified Calcium carbonate | | | | | | | 30.00 | | |
| Calcined alumina | | | | | | | | 30.00 | |
| Polypropylene powder | | | | | | | | | 30.00 |
| Total | 100 | 100 | 100 | 100 | 100 | 100 | 100 | 100 | 100 |

Example 2—Rheology of UV/Visible Light Curable Compositions

Table 2 summarizes the rheological properties (viscosity and Thixotropic Index (TI)) of the nine compositions of Example 1. Viscosities were measured at shear rate of 1 s$^{-1}$ and 10 s$^{-1}$ using cone and plate rheometer (Anton Paar). Thixotropic Index (TI) was calculated as the ratio of viscosities at 1 s$^{-1}$ and 10 s$^{-1}$.

TABLE 2

| Composition | Viscosity at 1 s$^{-1}$ (cP) | Viscosity at 10 s$^{-1}$ (cP) | Thixotropic Index (TI) |
|---|---|---|---|
| 1 | 37,580 | 6,138 | 6.12 |
| 2 | 387,700 | 48,680 | 7.96 |
| 3 | 1,306,000 | 138,000 | 9.46 |
| 4 | 725,900 | 93,700 | 7.75 |
| 5 | 955,500 | 113,800 | 8.40 |
| 6 | 211,400 | 16,920 | 12.49 |
| 7 | 2,377,000 | 75,790 | 31.36 |
| 8 | 458,000 | 51,640 | 8.87 |
| 9 | 100,500 | 12,570 | 8.00 |

Example 3—Chemical Resistance of UV/Visible Light Cure Compositions

Table 3 summarizes the results (as percent weight change) of chemical resistance testing of some of the UV/visible light curable compositions shown in Table 1. The light curable composition was placed between two plastic sheets with 1mm thick spacer, and light cured for 30 seconds in a UV chamber with UV A light intensity of 100 mw/cm$^2$. The cured sheet was cut into 20 mm long and 10 mm wide rectangular specimen. The specimen was then immersed in pH 1.5 hydrochloric acid solution or pH 12.5 sodium hydroxide solution for 2 weeks at 50° C.

After immersion, the specimen was rinsed with distilled water and dried at 50° C. for 4 hours. The weight change (%) was calculated by the weight percent difference of the specimen before and after immersion. For comparison, a commercial light cure adhesive (Loctite LT AA3979) was also tested.

TABLE 3

| Composition | pH 1.5 Solution | pH 12.5 Solution |
|---|---|---|
| 1 | −0.87 | −2.07 |
| 4 | −0.35 | −4.05 |
| 5 | −0.31 | −2.38 |
| 6 | −1.00 | −29.90 |
| 7 | −4.11 | −7.70 |
| 8 | −0.56 | −3.19 |
| 9 | −0.67 | −2.16 |
| Loctite LT AA 3979 | −12.31 | −28.36 |

Among the fillers used, Aerosil R202 and zirconium silicate had less than 3% weight loss after 2 weeks immersion in both pH 1.5 and 12.5 solutions. Weight change of formulations with Calcined Alumina or aluminium silicate was less than 4%. However, the formulas with precipitated silica had very poor chemical resistance in pH 12.5 solution. The formulas with calcium carbonate had poor chemical resistance in both pH 1.5 and 12.5 solutions. Loctite AA 3979 had the worst chemical resistance in both pH 1.5 and 12.5 solutions due to the acrylate resins used in the formulas.

Comparative Example 1–Comparison of Various Existing Adhesives and Dispensing Methods Optimized rheology is required for the printability of the curable composition while also having the desired aspect ratio to optimize the membrane's surface area. Moreover, the cure speed is also a critical factor in the manufacturing method. Table 4 is a comparison of some existing dispensing methods using different products. This table lists several categories of products, their viscosity, the dispensing method used, and the targeted feature height, feature width and aspect ratio. The curing time for single dispensed material using the corresponding dispensing method, and the produced area ($m^2$) per minute with the targeted features are also shown in Table 4. The target width was 0.020 inch with a target processing speed of at least 2 $m^2$ per minute.

UV ink with low viscosity is generally used for ink jet printing. It prints a very thin layer each time, therefore it takes long time to produce the feature heights. Jet valve dispensing using liquid or gel light cure acrylate (LCA) with higher viscosity has similar issues of low speed. Hot melt material such as polyolefine (PO) has high producing speed, but has difficulty achieving a high aspect ratio.

As shown in Table 4, UV Ink and Gel LCA achieve a good aspect ratio, PO Hot Melt achieves an adequate aspect ratio, and Liquid LCA achieves an unacceptable aspect ratio. UV Ink, Gel LCA, and Liquid LCA have a good cure time and PO Hot Melt has an unacceptable cure time. UV Ink, Gel LCA, and Liquid LCA have an unacceptable production (area $m^2$) per minute and PO Hot Melt has a good production (area $m^2$) per minute. Accordingly, none of these existing methods achieved acceptable overall results.

TABLE 4

| Category of Product | UV Ink | UV Ink | Liquid LCA | Gel LCA | Gel LCA | PO Hot Melt |
|---|---|---|---|---|---|---|
| Typical Viscosity (cP) | 10 | 10 | 5,000 | 50,000 | 50,000 | 12,000 (at 170° C.) |
| Dispense Method | Ink Jet | Ink Jet | Jet Valve | Jet Valve | Touch Transfer | Gravure |
| Feature Height (in) | 0.015 | 0.018 | 0.010 | 0.015 | 0.015 | 0.012 |
| Feature Width (in) | 0.025 | 0.044 | 0.065 | 0.033 | 0.022 | 0.022 |
| Feature Aspect Ratio (H/W) | 0.60 | 0.40 | 0.15 | 0.45 | 0.66 | 0.31 |
| Cure Time (sec) | 1 | 1 | 5 | 5 | 5 | 30 |
| Production (Area ($m^2$)) per minute | 0.016 | 0.014 | 0.026 | 0.026 | Too Slow, n/a | 100 |

Example 4–Stencil Printability of UV/Visible Light Cure Compositions

Table 5 shows the results of the stencil printability measurement of the UV/visible light cure compositions in Table 1. For stencil printing, each material was applied to a Nanoclear (Aculon) coated steel stencil with aperture size of 0.15 inch×0.02 inch and thickness of 0.01 inch. The material was manually printed onto a membrane using a polyurethane Durometer 70 squeegee. The printed pattern on the membrane was immediately transferred to a UV chamber with UV A light intensity of 100 mw/$cm^2$ and cured for 10 seconds, or cured for 3 seconds using a 405 nm LED light with intensity of 90 mw/$cm^2$. The initial printability was evaluated for the cleanness of the curable composition separated from stencil aperture after printing and lifting the stencil, the printed pattern surface smoothness and if the shape slumped.

TABLE 5

| Curable Composition | Curable Composition Release from Stencil Aperture | Printed Pattern Surface Appearance | Printed Pattern Shape |
|---|---|---|---|
| 1 | Partial | Smooth | Slumped |
| 2 | Partial | Smooth | Good |

TABLE 5-continued

| Curable Composition | Curable Composition Release from Stencil Aperture | Printed Pattern Surface Appearance | Printed Pattern Shape |
|---|---|---|---|
| 3 | Partial | Not Smooth | Good |
| 4 | Good | Smooth | Good |
| 5 | Good | Smooth | Good |
| 6 | Good | Smooth | Good |
| 7 | Good | Smooth | Good |
| 8 | Good | Smooth | Good |
| 9 | Good | Smooth | Good |

Example 5–Stencil Printed Pattern of UV/Visible Light Cure Compositions with Wet Printing Curable Compositions 5 and 9 in Table 1 having relatively better chemical resistance and stencil printability were used for further studies. Wet printing means that the conventional stencil printing was employed, i.e., the curable composition was printed on the substrate, the stencil was lifted, and then the curable composition was cured.

The curable composition was printed on a membrane using semi-automated printer with a coated stainless steel (SS) stencil or plastic stencil. The stencil aperture had 0.02 inch width, 0.015 inch length. Thickness of coated stainless stencil was 0.012 inch, 0.017 inch and 0.022 inch, respectively. The thickness of plastic stencil was 0.01 inch. The printed dimensions of Composition 5 using coated stainless stencil and Composition 6 using plastic stencil were shown in Table 6 (wet printing). The length and width of the printed pattern were measured by Hirox microscopy. The thickness was measured by a Laser profilometer. Aspect ratio was calculated as the ratio of height to width.

TABLE 6

| Printed Pattern Dimensions | Height (inch) | Width (inch) | Length (inch) | Aspect Ratio | Cure Speed (s) | Produced Area (m²) per min |
|---|---|---|---|---|---|---|
| 0.012 inch thick Coated SS Stencil | 0.007 | 0.023 | 0.148 | 0.30 | 5 | 3 |
| 0.01 inch thick Plastic Stencil | 0.009 | 0.024 | 0.152 | 0.38 | 5 | 3 |
| 0.017 inch thick Coated SS Stencil | 0.014 | 0.026 | 0.150 | 0.54 | 5 | 3 |
| 0.022 inch thick Coated SS Stencil | Composition was partially released | | | | | |

The curing speed and production speed by stencil printing was faster than most of the existing dispensing methods in Table 4. The printed results showed printed pattern using wet printing can achieve aspect ratio around 0.5. However, it is technically challenging to produce patterns with higher aspect ratios than 0.5.

Example 6–Stencil Printed Pattern of UV/Visible Light Cure Compositions with Pre-Cure Method In this example, the materials, stencils, printer and printed pattern measurement methods were the same as Example 5. A pre-cure method was used to increase the printed pattern aspect ratio. In the pre-cure method the curable composition was printed on the substrate, and before the stencil was lifted, the curable composition in the stencil aperture was partially light cured from the back of the membrane and its holder. The curable composition became solid on the part touching the membrane but remained uncured on the stencil surface. The stencil was then lifted and separated from membrane. The printed pattern stayed on the membrane and was further light cured to reach its full cured properties.

The printed dimensions of Composition 5 using Coated SS Stencil and Composition 6 using Plastic Stencil with 0.03 inch thickness are shown in Table 7 (pre-cure method).

TABLE 7

| Printed Pattern Dimensions | Height (inch) | Width (inch) | Length (inch) | Aspect Ratio | Cure Speed (s) | Produced Area (m²) per min |
|---|---|---|---|---|---|---|
| 0.022 inch thick Coated SS Stencil | 0.017 | 0.025 | 0.152 | 0.68 | 7 | 2 |
| 0.03 inch thick Coated SS Stencil | 0.029 | 0.021 | 0.151 | 1.38 | 7 | 2 |

The results in Table 7 show that the aspect ratio can be improved by using the pre-cure method with little reduction of production speed.

The invention claimed is:

1. A method of forming topographical features on a membrane surface comprising:
provproviding a membrane comprising a membrane surface and an opposed side of the membrane;
providing a stencil or screen over the membrane surface, the stencil or screen having openings exposing the membrane surface for receiving a curable composition;
depositing one or more layers of curable composition having a Thixotropic index (TI) (cp at 1 s$^{-1}$/cp at 10 s$^{-1}$) from about 2 to about 15 into the stencil openings or screen openings and onto the membrane surface to form the topographical features, the openings defining an approximate shape and size of the topographical features;
exposing the opposed side of the membrane to a light source to partially cure the one or more layers of curable composition;
removing the stencil or screen to leave in place the topographical features on the membrane surface; and
fully curing the curable composition,
wherein, after removal of the stencil or screen and prior to curing, the topographical features have an aspect ratio (height/width) from about 0.5 to about 2;
wherein, after curing, the aspect ratio of the topographical features is substantially the same; and
wherein the height of the topographical feature is from about 0.025 inches to about 0.04 inches.

2. The method of claim 1, wherein the topographical aspect ratio (height/width) is greater than about 0.70.

3. The method of claim 1, wherein the curable composition is fully cured using a light source.

4. The method of claim 3, wherein the light source produces ultraviolet or visible light.

5. The method of claim 3, wherein the light source is a bulb or light emitting diode.

6. The method of claim 1, wherein a pattern of topographical features is formed on the membrane surface at speeds of about 0.5 m$^2$/minute or greater.

7. The method of claim 1, further comprising depositing additional layers of curable composition into the stencil openings or screen openings and onto the membrane surface.

8. The method of claim 1, wherein the topographical features are substantially free of sharp edges after formation and removal of the stencil.

9. The method of claim 1, wherein the membrane surface is a filter membrane surface.

10. The method of claim 1, wherein the approximate size and shape of the topographical features and the topographical aspect ratio are substantially maintained during removal of the stencil or screen from the membrane surface prior to full cure.

11. The method of claim 1, wherein the curable composition comprises:
a. a light curable component comprising a backbone selected from the group consisting of (meth)acrylates, epoxies, polyisobutenes (PIB), polyurethanes (PU), polyolefins (PO), ethylvinylacetates (EVA), polyamides (PA) and combinations thereof; and a light curing moiety;
b. a cure system; and
c. a rheology modifying component present in an amount of about 2% to about 50% by weight of the total curable composition.

12. The method of claim 11, wherein the rheology modifying component is selected from the group consisting of silica, silicate, alumina, asbestos, barium sulphate, calcium carbonate, calcium fluoride, carbon black, clays, diatomaceous earth, feldspar, ferromagnetics, fly ash, glass fibers, gypsum, jute fiber, kaolin, lingnocellulosics, magnesium hydroxide, mica, microcrystalline cellulose, powdered metals, quartz, starch, talc, titanium dioxide, wood flour, wood fibers, thermoplastic polymers, and combinations thereof.

13. The method of claim 11, wherein the light curable composition subsequent to cure is capable of less than about 5% weight loss when submerged in a aqueous solution at a pH range of about 0.5 to about 13.5 at temperatures of from about 25° C. to about 90° C. for in a 6 week period.

14. The method of claim 11, wherein the light curable component comprises a material selected from the group consisting of a urethane (meth)acrylate and a (meth)acylate.

* * * * *